United States Patent [19]

Juel et al.

[11] Patent Number: 4,465,581
[45] Date of Patent: Aug. 14, 1984

[54] COMPOSITE OF TIB$_2$-GRAPHITE

[75] Inventors: Leslie H. Juel; Louis A. Joo', both of Johnson City; Kenneth W. Tucker, Elizabethton, all of Tenn.

[73] Assignee: Great Lakes Carbon Corporation, New York, N.Y.

[21] Appl. No.: 287,129

[22] Filed: Jul. 27, 1981

[51] Int. Cl.$^3$ .............................................. C25B 11/04
[52] U.S. Cl. ................................ 204/290 R; 204/291; 423/289; 427/126.1
[58] Field of Search ................. 204/67, 290 R, 291, 204/294, 290; 252/425.3; 423/289; 427/126.1

[56] References Cited

U.S. PATENT DOCUMENTS

| | | | |
|---|---|---|---|
| 2,915,442 | 12/1959 | Lewis | 204/67 |
| 3,028,324 | 4/1962 | Ransley | 204/67 |
| 3,151,053 | 9/1964 | Lewis | 204/244 |
| 3,156,639 | 11/1964 | Kibby | 204/243 |
| 3,314,876 | 4/1967 | Ransley | 204/291 |
| 3,400,061 | 9/1968 | Lewis | 204/67 |
| 3,676,371 | 7/1972 | Zollner et al. | 204/291 X |
| 4,071,420 | 1/1978 | Foster | 204/67 |

FOREIGN PATENT DOCUMENTS 882992 10/1980 Belgium .
922384 3/1973 Canada .............................. 327/114

OTHER PUBLICATIONS

Billehaug, K. et al., "Inert Cathodes for Aluminium Electrolysis in Hall–Heroult Cells", *Aluminium*. vol. 56, (1980), pp. 642–648, and 713–718.

*Primary Examiner*—F. Edmundson
*Attorney, Agent, or Firm*—Adrian J. Good

[57] ABSTRACT

TiB$_2$-graphite composite articles suitable for use as cathode components in a Hall aluminum reduction cell are made by impregnating a TiO$_2$-carbon composite with a boron compound and carbon black dispersed in water, or alternately by impregnating a boron or boron compound-carbon composite with a carbon black-TiO$_2$ dispersion, and heating the article to a reaction temperature whereby TiB$_2$ is formed and the amorphous carbon converted to graphite. The article may be impregnated with a carbonizable liquid, re-baked, and re-heated to a graphitizing temperature to increase its strength and density.

9 Claims, No Drawings

COMPOSITE OF TIB$_2$-GRAPHITE

DESCRIPTION

BACKGROUND OF THE INVENTION

Aluminum metal has been produced for 90 years in the Hall cell by electrolysis of alumina in a molten cryolite salt electrolyte bath operating at temperatures in the range of 900°–1000° C. The reactivity of the molten cryolite, the need for excellent electrical conductivity, and cost considerations have limited the choice of materials for the electrodes and cell walls to the various allotropic forms of carbon.

Typically the Hall cell is a shallow vessel, with the floor forming the cathode, the side walls being a rammed coke-pitch mixture, and the anode being a block suspended in the bath at an anode-cathode separation of a few centimeters. The anode is typically formed from a pitch-calcined petroleum coke blend, prebaked to form a monolithic block of amorphous carbon. The cathode is typically formed from a pre-baked, pitch-calcined anthracite or coke blend, with cast-in-place iron over steel bar electrical conductors in grooves in the bottom side of the cathode.

During operation of the Hall cell, only about 25% of the electricity consumed is used for the actual reduction of alumina to aluminum, with approximately 40% of the current consumed by the voltage drop caused by the resistance of the bath. The anode-cathode spacing is usually about 4-5 cm., and attempts to lower this distance result in an electrical discharge from the cathode to the anode through aluminum droplets suspended in the bath.

The molten aluminum is present as a pad in the cell, but is not a quiescent pool due to the factors of preferential wetting of the carbon cathode surface by the cryolite melt in relation to the molten aluminum, causing the aluminum to form droplets, and the erratic movements of the molten aluminum from the strong electromagnetic forces generated by the high current density.

The wetting of a solid surface in contact with two immiscible liquids is a function of the surface free energy of the three surfaces, in which the carbon cathode is a low energy surface and consequently is not readily wet by the liquid aluminum. The angle of a droplet of aluminum at the cryolite-aluminum-carbon junction is governed by the relationship $$\cos \theta = \frac{\alpha_{12} - \alpha_{13}}{\alpha_{23}}$$

where $\alpha_{12}$, $\alpha_{13}$, and $\alpha_{23}$ are the surface free energies at the aluminum carbon, cryolite-carbon, and cryolite-aluminum boundaries, respectively.

If the cathode were a high energy surface, such as would occur if it were a ceramic instead of carbon, it would have a higher contact angle and better wettability with the liquid aluminum. This in turn would tend to smooth out the surface of the liquid aluminum pool and lessen the possibility of interelectrode discharge allowing the anode-cathode distance to be lowered and the thermodynamic efficiency of the cell improved, by decreasing the voltage drop through the bath.

Typically, amorphous carbon is a low energy surface, but also is quite durable, lasting for several years duration as a cathode, and relatively inexpensive. However, a cathode or a cathode component such as a TiB$_2$ stud which has better wettability and would permit closer anode-cathode spacing could improve the thermodynamic efficiency and be very cost-effective.

Several workers in the field have developed refractory high free energy material cathodes. U.S. Pat. No. 2,915,442, Lewis, Dec. 1, 1959, claims a process for production of aluminum using a cathode consisting of the borides, carbides, and nitrides of Ti, Zr, V, Ta, Nb, and Hf. U.S. Pat. No. 3,028,324, Ransley, Apr. 3, 1962, claims a method of producing aluminum using a mixture of TiC and TiB$_2$ as the cathode. U.S. Pat. No. 3,151,053, Lewis, Sept. 29, 1964, claims a Hall cell cathode conducting element consisting of one of the carbides and borides of Ti, Zr, Ta and Nb. U.S. Pat. No. 3,156,639, Kibby, Nov. 10, 1964, claims a cathode for a Hall cell with a cap of refractory hard metal and discloses TiB$_2$ as the material of construction. U.S. Pat. No. 3,314,876, Ransley, Apr. 18, 1967, discloses the use of TiB$_2$ for use in Hall cell electrodes. The raw materials must be of high purity particularly in regard to oxygen content, Col. 1, line 73-Col. 2, line 29; Col. 4, lines 39–50, Col. 8, lines 1–24. U.S. Pat. No. 3,400,061, Lewis, Sept. 3, 1968 discloses a cathode comprising a refractory hard metal and carbon, which may be formed in a one-step reaction during calcination. U.S. Pat. No. 4,071,420, Foster, Jan. 31, 1978, discloses a cell for the electrolysis of a metal component in a molten electrolyte using a cathode with refractory hard metal TiB$_2$ tubular elements protruding into the electrolyte. Ser. No. 043,242, Kaplan et al. (Def. Pub.), filed May 29, 1979, discloses Hall cell bottoms of TiB$_2$. Canada No. 922,384, Mar. 6, 1973, discloses in situ formation of TiB$_2$ during manufacture of arc furnace electrodes. Belgian No. 882,992, PPG Ind., Oct. 27, 1980, discloses TiB$_2$ cathode plates.

Our co-pending applications, Ser. No. 186,181 and Ser. No. 186,182, filed Sept. 11, 1980, disclose related subject matter.

SUMMARY OF THE INVENTION

Titanium Diboride, TiB$_2$ has been proposed for use as a cathodic element in Hall cells, giving an improved performance over the amorphous carbon and semi-graphite cathodes presently used.

It had previously been known that Titanium Diboride (TiB$_2$) was useful as a cathode component in the electrolytic production of aluminum, when retrofitted in the Hall cell as a replacement for the carbon or semi-graphite form. The electrical efficiency of the cell was improved due to better conductivity, due mainly to a closer anode-cathode spacing; and the corrosion resistance was improved, probably due to increased hardness, chemical inertness and lower solubility as compared to the carbon and graphite forms.

The principal deterrent to the use of TiB$_2$ as a Hall cell cathode or cathode component has been the sensitivity to thermal shock and the great material cost, approximately $25/lb., as compared to the traditional carbonaceous compositions, which cost about $0.60/lb. Also, if the anode-cathode distance could be lowered, the % savings in electricity would be as follows:

| A-C distance | % savings |
| --- | --- |
| 3.8 cm. | std. |
| 1.9 cm. | 20% |
| 1.3 cm. | 27% |
| 1.0 cm. | 30% |

We have invented an improved process for producing a $TiB_2$-carbon composite which shows excellent performance as a cathode or cathode component in Hall aluminum cells. The method is markedly more economical, and also produces an unexpectedly improved cathode when its performance is compared to the traditional carbonaceous material.

The method involves the use of a titania($TiO_2$)-graphite composite structure as a starting material. $TiO_2$ is dispersed in the mixture of coke particles and flour, then wetted and dispersed in a carbonizable liquid binder to form a plastic mass. The binder is preferably a coal tar pitch, however, petroleum pitches, phenolic resins, lignin sulfonate, and other carbonizable binders may also be used.

The coke particles most useful are selected size ranges of calcined delayed petroleum coke, made by heating a heavy hydrocarbon fraction to about 500°–510° C. and holding the material in a coker drum for about 18 hours, while taking the gas oils vaporizing off to a combination tower for separation and recycling. The solid coke residue remaining is removed, then calcined at approximately 1200°–1300° C. to form the calcined coke useful in Hall cell electrodes or electrode components, and for conversion to graphite. Regular coke is isotropic, with a coefficient of thermal expansion (CTE) characteristic of from 10 to $30 \times 10^{-7}$ cm/cm/°C., over the range of 0° to 50° C., relatively uniform on all 3 geometric axes in physical properties, while an acicular or needle coke will generally be anisotropic having a CTE characteristic which is variant on the axes and less than $10 \times 10^{-7}$ cm/cm/°C. on the principal axis. Coke flour may also be included, using a particle size range with about 50% passing a 79 mesh/cm (200 mesh per in.) screen.

The filler carbon in the original formed article may also be obtained from other common sources, such as pitch coke, charcoal and metallurgical cokes from coal, with a mean particle diameter of about 3 mm being preferable, and a high surface area/wt. ratio.

The plastic mass is then molded or extruded to form the desired shape and baked on a cycle rising to 700°–1100° C. over a period of 1 to 10 days to carbonize the binder, forming a solid C-$TiO_2$ composite.

The baked carbon-$TiO_2$ composite shape produced is a structure containing $TiO_2$ and particulate carbon firmly bound in the matrix of carbonized pitch. The structure is highly porous due to the inherent porosity of the coke, incomplete packing, and the volatilization of about 30–40% of the initial weight of the pitch, and is specially formulated for high porosity.

The baked composite shape is then impregnated in a pressure vessel under alternate cycles of vacuum and about $7 \times 10^3$ Pa (100 PSI) pressure with a dispersion of $B_2O_3$ and carbon black or other micronized carbon in $H_2O$. Either $B_2O_3$ or $H_3BO_3$ may be used as $B_2O_3$ is hydrolyzed to $H_3BO_3$ in $H_2O$ by the reaction:

$$B_2O_3 + 3H_2O \rightarrow 2H_3BO_3$$

The carbon black or other finely divided carbonaceous material is dispersed in $H_2O$ in a high shear mixer with the addition of dispersing agents and stabilizers to form a stable dispersion.

After impregnation with the dispersion, the article is then dried slowly to 100° C. to minimize loss of the solid impregnants while vaporizing the water. Multiple impregnations, each followed by a drying cycle, may be necessary.

Alternately, the article may be impregnated with a carbon black dispersion in molten $B_2O_3$ or boric acid.

A further modification of the above procedure consists of mixing stoichiometric amounts of $TiO_2$, carbon black and $B_2O_3$, heating the mixture to melt the $B_2O_3$, dispersing the $TiO_2$ and carbon in the molten $B_2O_3$, cooling, allowing the paste to harden to a solid, milling the solid to a powder, dispersing the powder in a binder, then using this dispersion as an impregnant.

The boron compound and carbon black may be dispersed in a molten pitch or other carbonizable binder such as a petroleum pitch with a 110°–120° C. softening point, and the resulting dispersion used as an impregnant. Each impregnating cycle will normally require a bake to the 700°–1100° C. range, carbonizing the binder.

The process may also be used by mixing boron carbide ($B_4C$) with coke particles and binder in the initial mix, baking, then impregnating the resulting baked piece with a $TiO_2$-carbon black dispersion in a carbonizable binder.

The unique aspect of the process provides a method whereby $TiB_2$ is formed during subsequent heat treatment to a temperature above 2000° C., while the carbon is being made graphitic. The carbon black or similar finely divided carbon acts as the reductant to minimize consumption of the article matrix during the reaction of $TiO_2$ and $B_2O_3$ to form $TiB_2$.

$$TiO_2 + 5C + B_2O_3 \rightarrow TiB_2 + 5CO \uparrow \leq 1200° \text{ C.}$$

Initial mixing, shaping by molding or extrusion of $TiO_2$, coke, and binder pitch follow the standard practice of the carbon and graphite industry. The article is heat treated at 600° to 1100° C. to carbonize the binder, cooled and is then impregnated as described in a heated pressure vessel at temperatures from 100°–500° C. and pressures from $2-15 \times 10^3$ Pa (50–200 PSI).

After drying, the article is heated to the reaction temperature for the formation of $TiB_2$, in the range of 1200°–1800° C. The reaction starts to take place at about 800° C. but is quite slow below 1200° C. and reaches a high reaction rate at about 1750° C. The heat treatment may be done in stages, with re-impregnation and reheating cycles to build up the desired concentration of $TiB_2$.

Due to the loss of the carbon black and possibly a portion of the binder and coke as CO during the $TiB_2$ forming reaction, the article may develop excess porosity and consequently have low strength and be poor in other physical properties. This can be remedied by additional impregnation with a carbonizable binder, preferably a petroleum pitch with a softening point in the 110°–120° range, although lignin sulfonate, phenolic resins and other pitches may be used, under about $7 \times 10^3$ Pa (100 PSI) at about 200°–250° C. in a heated pressure vessel. After impregnation, the article is again heated to the 600° to 1100° C. range over a period of 2 to 10 days to carbonize the pitch, sealing the surface and strengthening the article.

The last step in the process will generally include heating the article to 2000° C. or higher, converting the carbon to the graphitic form. Generally the temperature range preferred is about 2400°–2500° C., although for particular processes any point in the 2000°–3000° range may be used.

EXAMPLE 1

A cathode shape is made by mixing coke particles with a mean diameter of 3 mm, coal tar pitch having a softening point of approximately 110°–120° C. and $TiO_2$ in a high-shear heated mixer. The mix is heated to approximately 175° and the coke and $TiO_2$ are well dispersed in the molten pitch. The cathodic element is molded at about $14 \times 10^6$ Pa (2000 PSI) pressure, then baked on a cycle rising to 720° in six days.

After removal from the oven the shape is placed in an autoclave and impregnated with a dispersion of a rubber reinforcing grade of carbon black and $B_2O_3$ in $H_2O$, then removed and dried slowly to vaporize the $H_2O$ without loss of $B_2O_3$. The piece is next heated to 1500° C., at which temperature the $TiO_2$ and $B_2O_3$ react, releasing CO. These gas-producing steps are carried out slowly in order to avoid fissuring due to too-rapid gas evolution.

The piece is then re-impregnated, using a petroleum pitch with a softening point of from 110°–120° C., baked to carbonize the pitch on a six day cycle, the temperature rising to 720° C., which fills the porosity left by the $TiB_2$ forming reaction, then graphitized by heating to 2400° C.

EXAMPLE 2

A mixture is prepared having the following composition:

|  |  |
|---|---|
| $B_2O_3$ | 38 wt. % |
| Carbon black | 29 wt. % |
| $TiO_2$ | 33 wt. % |
|  | 100 wt. % |

The solids above are mixed in a sigma type mixer, then heated to the melting point of $B_2O_3$ or slightly higher, which may vary considerably with the purity. Pure $B_2O_3$ has a melting point of 450° C. but the commercially available grades usually melt at around 275° or slightly higher. The carbon and $TiO_2$ are thoroughly dispersed in the molten $B_2O_3$, then the mixture is dumped and allowed to cool and harden. The solid is ground to a fine particle size dispersion passing a 24 mesh/cm screen (60 mesh/in), then used to form an electrode mix of the following composition:

Above mix: 100 parts by wt.
Coal tar pitch, S.P. 110°–120° C.: 32 part by wt.

This is mixed in a sigma type mixer heated to about 175° C., dispersing the carbon black and reactive mixture in the melted pitch. After partial cooling, an article is molded, cooled, then baked to 720° over a six day period, carbonizing the binder. It is then heated to about 2000° C., driving the $TiB_2$ forming reaction to completion while graphitizing the carbon residue. The body thus formed is a very porous semi-graphite-$TiB_2$ composite. The composite is impregnated with petroleum pitch having a 110°–120° softening point under alternate cycles of vacuum and pressure at about 240° C., and re-baked on the above slow carbonizing cycle to 720°. The impregnation and baking steps are repeated, then the article is re-graphitized at 2300° C., to form a strong grahite-$TiB_2$ composite with about 60% $TiB_2$ content by wt.

EXAMPLE 3

A conventional carbon body, which has a high pore volume and is well suited for impregnation, is made from the following composition, by wt.:

|  |  |
|---|---|
| Calcined coke particles, maximum particle size 12 mm, mean particle size 5 to 10 mm | 60 |
| Coke flour, 50% passing 79 mesh/cm screen | 40 |
| Coal tar pitch, softening point 110°–120° | 25 |

The mix is blended, shaped and baked as in Example 1. The article is then impregnated under cycles of vacuum and pressure above the melting point of $B_2O_3$ with the mix prepared in Example 2, heated slowly to a $TiB_2$ forming temperature above 1200° C., preferably 1750°, held at that temperature for one to four hours, cooled and impregnated with the same petroleum pitch under alternate cycles of vacuum and pressure as above, rebaked as above, and heat treated to a temperature of 2100° or higher.

EXAMPLE 4

A cathode shape is formed from pitch, coke, and $TiO_2$ and baked as in Example 1. It is then impregnated with a dispersion of carbon black in molten $B_2O_3$ at $7 \times 10^3$ Pa (100 PSI). After impregnation, it is heated to 1500° for one hour to form $TiB_2$, then cooled, impregnated with petroleum pitch under cycles of vacuum and $7 \times 10^3$ Pa at 250°0 C., re-baked for six days, the temperature reaching 720° C., then graphitized by heating to 2300° C.

EXAMPLE 5

A mixture is prepared having the following composition:

|  | % by wt. |
|---|---|
| $B_4C$ | 8 |
| Coke particles (3 mm diam.) | 36 |
| Carbon black | 36 |
| Pitch (S.P. 110°) | 20 |
|  | 100 |

The $B_4C$, coke, and carbon black are mixed in a heated sigma mixer at about 170° C., the pitch added and the mixture wetted by the molten pitch to form a plastic dispersion. A cathodic element for a Hall cell is formed by molding the dispersion under about $1.4 \times 10^7$ Pa (2000 PSI) and baked on a cycle rising to about 800° C. in six days. After cooling to ambient temperature, the element is impregnated with a dispersion of 30% $TiO_2$ by wt. (ceramic pigment grade) in petroleum pitch (S.P. 110°–120° C.) at 240° C. under alternate cycles of vacuum and $6.9 \times 10^5$ Pa (100 PSI) pressure. The impregnation and bake steps are repeated to fully impregnate the element. It is next heated slowly to about 1750° C., at which temperature $TiB_2$ is formed and CO given off, and held at that temperature until the reaction is complete. To further strengthen the element and increase its density, it is re-impregnated with petroleum pitch, rebaked, then heated to about 2400° C. to convert the carbon matrix and particulate matter to a graphitic form.

We claim:
1. A process for the production of a composite $TiB_2$-graphitic carbon article comprising the steps of:

(1) Mixing $TiO_2$, coke, and a liquid carbonizable binder to form a first plastic dispersion;
(2) Shaping said dispersion to form an article;
(3) Baking said article to carbonize said binder on a cycle from 1 to 10 days rising to a final temperature from 600° to 1100° C.;
(4) Dispersing carbon black in liquid $B_2O_3$ to form a second dispersion;
(5) Impregnating said baked article with said second dispersion under a pressure from 2 to $15 \times 10^3$ Pa at a temperature from 100° to 500° C.;
(6) Heating the impregnated, baked article to at least 1200° C. to a $TiB_2$ forming temperature and maintaining that temperature until the $TiB_2$ forming reaction is substantially completed;
(7) Heating the article from (6) to at least 2100° C. to form said $TiB_2$-graphitic carbon composite article.

2. The process of claim 1 wherein the $TiO_2$ used is a ceramic pigment grade.

3. The process of claim 1 wherein the coke is a calcined petroleum coke with a mean particle size of 3 mm.

4. The process of claim 1 wherein the carbon used is a rubber reinforcing grade of carbon black.

5. The process of claim 1 wherein after the article is heated to the $TiB_2$ forming temperature, it is cooled, then impregnated under from 2 to $15 \times 10^3$ Pa pressure at from 200° to 250° C. with a petroleum pitch having a softening point from 110° to 120° C., then baked on a cycle with the temperature rising to 600° to 1100° C. over 2 to 10 days before graphitization at 2300° C.

6. The process of claim 1 wherein the article is impregnated with the second dispersion and baked a plurality of times, dried, then heated to a $TiB_2$ forming temperature.

7. The process of claim 1 wherein the second dispersion is a dispersion of carbon black in molten $B_2O_3$.

8. The process of claim 1 wherein the second dispersion is a dispersion of carbon black and $B_2O_3$ in $H_2O$, the article then being heated to about 100° C. to vaporize the $H_2O$.

9. The process of claim 6 wherein after heating to a boride forming temperature the article is re-impregnated with the second dispersion under alternate cycles of vacuum and pressure of from 2 to $15 \times 10^3$ Pa at 200° to 250° C., rebaked on a cycle of 2 to 10 days, the temperature rising to 700° to 1100° C., then graphitized at a temperature of 2300° C.

* * * * *